Aug. 21, 1934.                H. SCHURMANN                1,971,278
                               HARROW ATTACHMENT
                             Filed Aug. 21, 1933          2 Sheets-Sheet 1
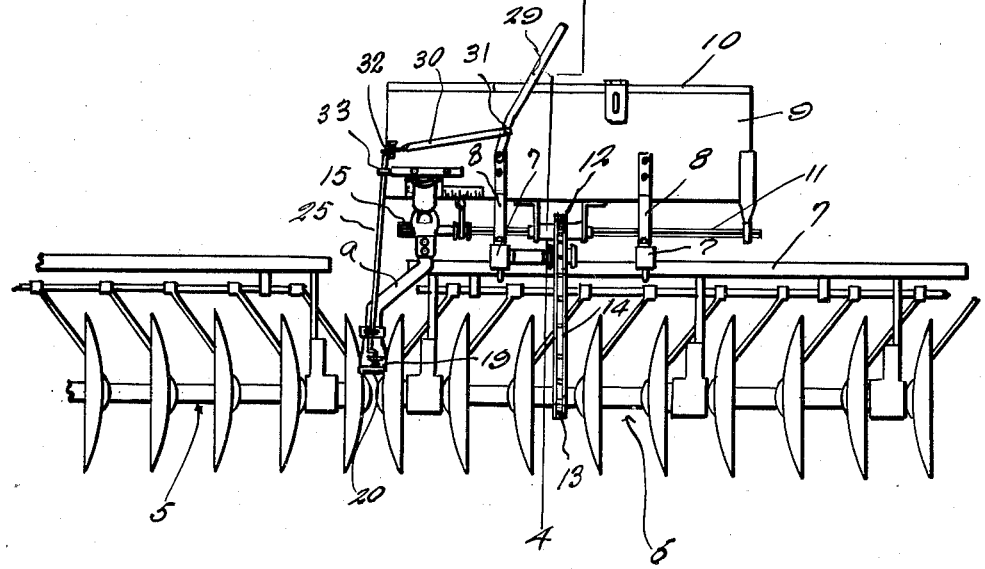
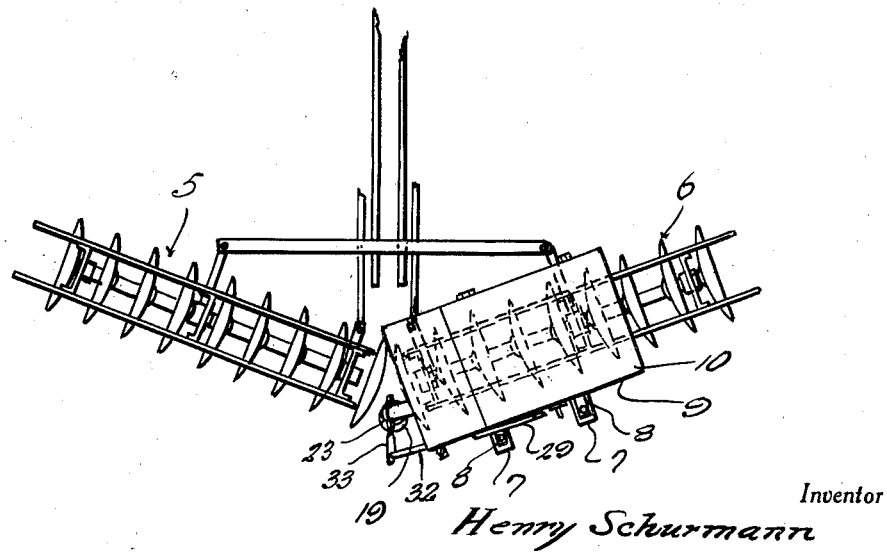
Inventor
Henry Schurmann
By Clarence A. O'Brien
Attorney

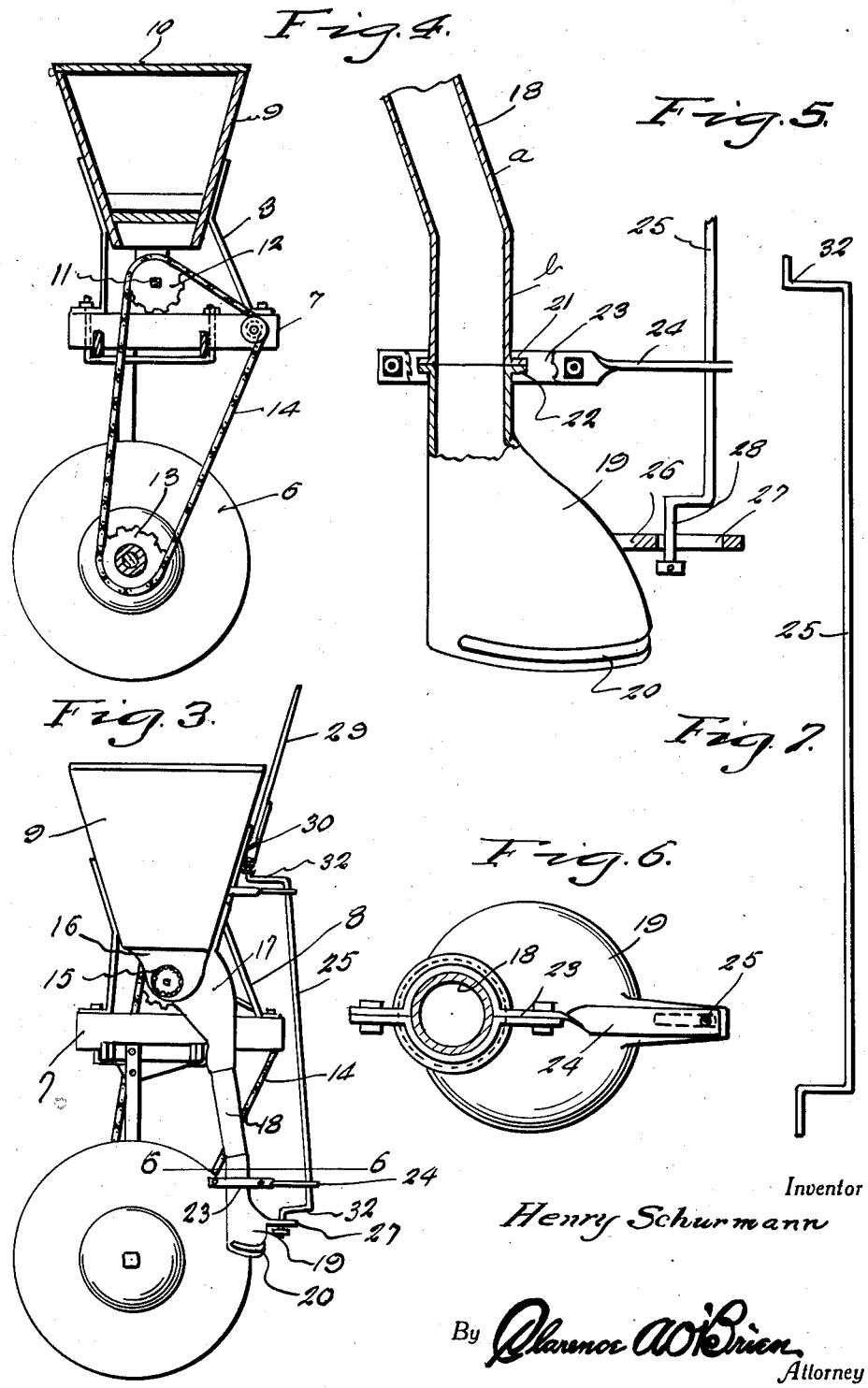

Patented Aug. 21, 1934

1,971,278

UNITED STATES PATENT OFFICE 1,971,278

HARROW ATTACHMENT

Henry Schurmann, Wynot, Nebr.

Application August 21, 1933, Serial No. 686,137

1 Claim. (Cl. 275—7)

This invention appertains to new and useful improvements in planter attachments for harrows and is an improvement on my co-pending application, Serial No. 624,823, filed July 26, 1932 on Harrows.

The principal object of the present invention is to provide a planter attachment whereby seed can be distributed onto the usual space left between the gangs of disk harrows.

Another important object of the present invention is to provide a seed planter attachment for harrows which can be readily adjusted to drop seed upon the ground along the path between the harrow gangs left seedless by the harrow.

Other important objects and advantages of the invention will become apparent to the reader of the following specification.

In the drawings:—

Figure 1 represents a fragmentary rear elevational view of the attachment on a harrow.

Figure 2 represents a fragmentary top plan view showing the attachment on a harrow.

Figure 3 represents an end elevational view of the attachment on a harrow.

Figure 4 represents a vertical sectional view taken substantially on line 4—4 of Figure 1.

Figure 5 represents a fragmentary detailed sectional view through the distributor of the planter attachment.

Figure 6 represents a sectional view taken substantially on line 6—6 of Figure 3.

Figure 7 represents a side elevational view of the crank shaft.

Referring to the drawings wherein like numerals designate like parts, it can be seen in Figure 1 that numerals 5—6 generally refer to a pair of harrow gangs of a multiple gang harrow. These gangs are connected for use in any conventional manner, as suggested in Figure 2. As is clearly shown in Figure 4, as well as in Figure 1, the frame of the harrow gang 6 has a platform 7 thereon and upright bracket members 8 support the trough 9 at a point spaced above the platform 7. This trough 9 is provided with a hinged cover 10 and means whereby the cover 10 can be secured to the trough.

Numeral 11 represents a shaft journaled through bearings below the trough 9 and on this shaft 11 is the sprocket wheel 12. The shaft of the gang 6 is also provided with a sprocket 13 and a chain 14 is trained over these sprockets 12 and 13. Thus the feed shaft 11 for the feeding element 15 of the planter is operatively connected with the harrow shaft. The feeding element 15 is mounted within the well 16 into which seed from the trough 9 drops and extending downwardly from this well 16 is the chute 17 having a depending spout 18. This spout has an offset portion $a$ therein and a depending portion $b$. The offset portion $a$ extends the vertical portion $b$ to a position over the space between the adjacent ends of the harrow gangs 5—6. The lower end of the spout 18 is provided with a head 19 which is provided with a semi-circular shaped slot 20 through which the seed can escape in a fan-like discharge.

As is clearly shown in Figure 5, the lower end of the portion $b$ of the spout 18 is provided with a circumferentially extending flange 21 abutting the circumferentially extending flange 22 at the upper end of the head 19 and a grooved clamp 23 engages over these flanges. In this clamp, the head 19 is swivelly supported and extending from this clamp is an arm 24 which is provided with an opening therein through which the lower portion of the crank shaft 25 is journaled. A lug 26 extends rearwardly from the head 19 and has a slot 27 therein in which the lower crank 28 of the shaft 25 operates.

Numeral 29 represents a swingable lever mounted on the back side of the trough 9 and a link 30 has one end pivotally connected thereto, as at 31. The other end of this link member 30 is pivotally connected to the crank 32 at the upper end of the shaft 25. The upper end portion of the shaft 25 is journaled through a bearing 33 supported by the back side of the trough 9.

It can now be seen, that in use, the lever 29 can be adjusted so as to rotate the crank shaft 25. By actuating the lower crank 28 thusly, the head 19 can be swung toward the left or the right to properly scatter the seed onto the ridge left by the opposed end disks of the harrow gangs 5—6.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:—

A planter of the character described comprising a hopper, a tube extending from the hopper, a discharge nozzle swivelly connected to the tube, a slotted lug projecting from the nozzle, a swingably supported lever, a substantially vertical and rotatably mounted shaft having a crank at each end thereof, a link pivotally connected at one end to the lever, the other end of the link being pivotally connected to the upper crank of the shaft, the lower crank of the shaft being disposed through the slot of the lug on the nozzle so that when the lever is actuated, the shaft will be rotated so as to cause adjustment of the nozzle by swinging thereof.

HENRY SCHURMANN.